United States Patent [19]

Blazevich

[11] Patent Number: 4,816,276
[45] Date of Patent: Mar. 28, 1989

[54] PROCESS FOR PREPARING SHRIMP

[75] Inventor: John Z. Blazevich, Rancho Palos Verdes, Calif.

[73] Assignee: ZB Industries, San Pedro, Calif.

[21] Appl. No.: 141,105

[22] Filed: Jan. 5, 1988

[51] Int. Cl.$^4$ .............................................. A22C 29/02
[52] U.S. Cl. ........................................ 426/479; 17/48; 17/72; 426/518; 426/643
[58] Field of Search .................. 426/479, 518, 643; 17/48, 52, 71, 73

[56] References Cited

U.S. PATENT DOCUMENTS

| | | | |
|---|---|---|---|
| 2,600,627 | 6/1952 | Envoldsen | 426/643 |
| 3,238,561 | 3/1966 | Jonsson | 17/48 |
| 3,324,504 | 6/1967 | Lapeyre | 17/72 |
| 3,353,207 | 11/1967 | Weinberger | 17/72 |

*Primary Examiner*—Peter Kratz
*Attorney, Agent, or Firm*—Pretty, Schroeder, Brueggemann & Clark

[57] ABSTRACT

An improved shrimp peeling, deveining and blanching process that is effective in removing the entire vein from the shrimp and that ensures that the entire exterior surface of the shrimp undergoes a desired color change. The vein is removed by making a longitudinal cut into the backside of only a few intermediate body segments and by pulling on the exposed portion of the vein, to remove that portion as well as the portions located in the uncut body segments. A subsequent blanching of the shrimp and the retention of uncut body segments at opposite ends of the shrimp ensure that the shrimp will retain its general shape and eliminate the possibility that portions of the shrimp will remain at their unappetizing blue-grey color when later cooked.

11 Claims, 1 Drawing Sheet

PROCESS FOR PREPARING SHRIMP

BACKGROUND OF THE INVENTION

This invention relates generally to processes for preparing shrimp for subsequent cooking, and, more particularly, to processes for deveining and blanching shrimp.

Shrimp are a delectable and popular food, whether boiled, broiled, barbecued or fried. Black tiger shrimp (penaeus fabricus monodon) are perhaps the most popular shrimp, normally cultivated in ponds and harvested in mass quantities. Although shrimp are quite tasty, they also are quite expensive, with a substantial portion of that expense resulting from the labor required to properly shell and devein the shrimp.

Like other crustaceans, shrimp have exterior skeletons, to shield their flesh against predators. Shrimp also carry their intestines, commonly called veins, in bags that extend along the length of their bodies. All varieties of shrimp have a head, a tail, and a number (typically five) of intermediate body segments. The skeleton shell encircles the shrimp, and swimmerettes project from the shrimp's front, concave side. The vein extends longitudinally through the shrimp's body segments, from the head to the tail, a small distance beneath the shrimp's back, convex side.

Shrimp are ordinarily prepared by removing the shell, head and swimmerettes and then cutting into the shrimp's backside to extract the vein. Two common techniques are used for deveining. In one such technique, a small section of the shrimp's backside (e.g., one body segment) is initially cut to expose the vein. Using a pin or the like, the vein is then lifted away and pulled axially from the uncut body segments. Although this deveining technique is usually satisfactory, the vein can frequently break, leaving sections of it remaining within the uncut body segments. This, of course, results in an unsatisfactory taste.

In an alternative deveining technique, the entire backside is cut, i.e., all five body segments, to expose the entire vein for removal. Although this technique is generally effective in ensuring that the entire vein is removed, the full cut significantly alters the shrimp's shape and detracts from its appearance. This full cut also can lead to other unsatisfactory results. For example, when the shrimp are sometimes cooked on a grill, a sideways curl away from the full cut can inhibit a change in color for the entire shrimp, from its original, unappetizing blue-grey color. Even a prior blanching in hot water is not always effective in changing the color of side portions of the fully-cut shrimp.

It should therefore be appreciated that there is a need for an improved process for deveining shrimp in a way that ensures removal of the entire vein while simultaneously ensuring that the entire surface of the shrimp undergoes a desired color change. The present invention fulfills this need.

SUMMARY OF THE INVENTION

This invention resides in a shrimp deveining and blanching process that is effective in completely removing the view of the shrimp and in ensuring that substantially the entire surface of the shrimp undergoes a desired color change. In the process of the invention, the shell, head and swimmerettes of the shrimp are initially removed, after which a longitudinal cut is made through the backside of all of the shrimp's plurality of body segments except for the single body segments at its opposite ends, adjacent the site of the removed head and the tail. This exposes an intermediate portion of the vein, which is then removed by pulling it out. Pulling on the exposed portion of the vein takes with it the portions of the vein still located within the uncut end body segments. Finally, the deveined shrimp is blanched. By limiting the cut provided in the step of cutting to all but the two end body segments, the shrimp's shape remains substantially undeformed and the subsequent step of blanching is effective in changing the color of the entire exterior surface of the shrimp. This result is of significant importance when the shrimp is subsequently cooked at a temperature otherwise insufficient to fully change the shrimp's initial blue-grey color.

In other, more detailed aspects of the invention, the longitudinal cut made in the shrimp's intermediate body segments is made just deep enough to expose the vein. The blanching step preferably includes a step of immersing the shrimp in water having a temperature that exceeds about 60 degrees centigrade, for a time period of at least about 2 seconds. In the preferred process of the invention, the water has a temperature in the range of about 85 to 95 degrees centigrade and the shrimp is immersed in the water for about 8 seconds. The shrimp is preferably placed with other shrimp loosely in a wire basket, for immersion into the water.

At various stages before and during the process of the invention, the shrimp is rinsed or otherwise stored in water having a temperature of less than about 10 degrees centigrade. This rinsing is of particular importance following the cutting and vein removing steps, to the growth of bacteria.

Other features and advantages of the present invention will become apparent from the following description of the preferred process, taken in conjunction with the accompanying drawings, which disclose, by way of example, the principles of the invention.

DESCRIPTION OF THE PREFERRED PROCESS

Figure 1:
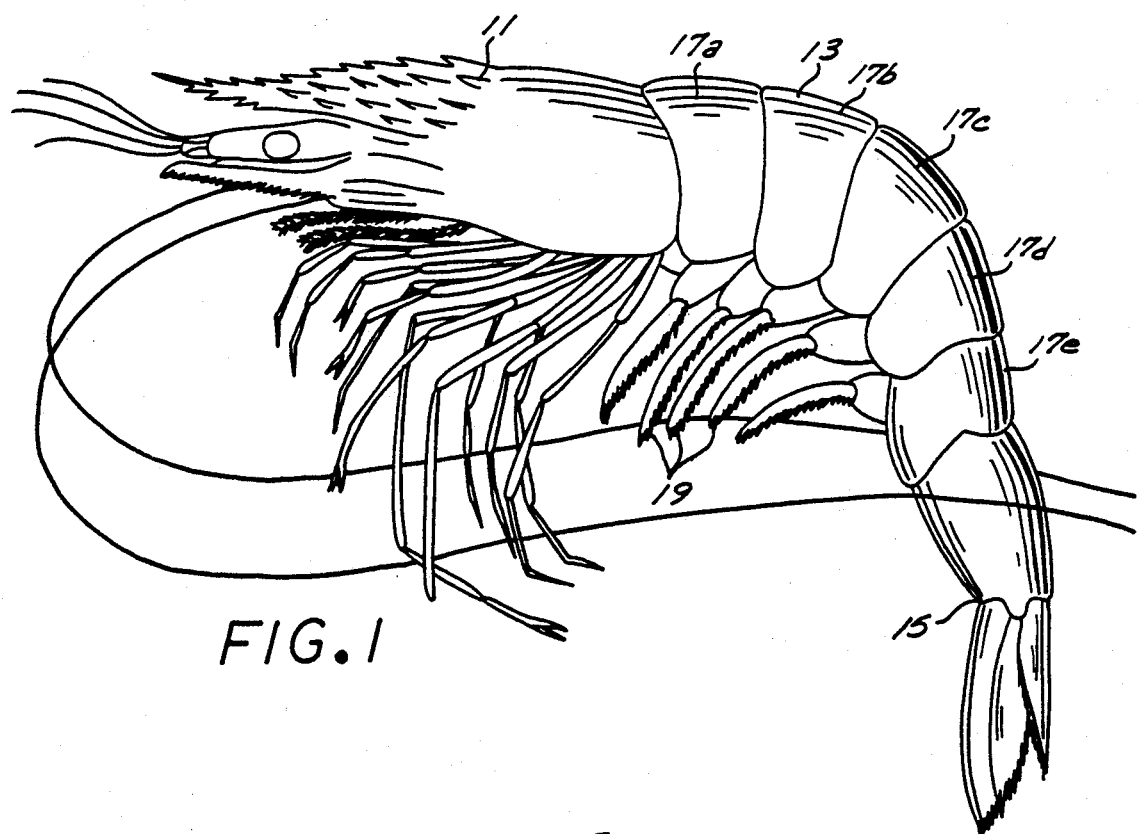
FIG. 1 is a side view of an unprocessed black tiger shrimp of the kind on which the process of the invention can be performed.

With reference now to the drawings, and particularly to FIG. 1, there is shown a black tiger shrimp (penaeus fabricus monodon) of the kind on which the deveining and blanching process of the invention can be performed. The shrimp includes a head 11, a shell 13, a tail 15, and a plurality of intermediate body segments 17a-17e. Swimmerettes 19 project outwardly from the front side of the five body segments. In the process of the invention, all of the inedible portions of the shrimp are removed, and the remainder is blanched in a way that ensures that the entire shrimp undergoes the desired color change, i.e., from blue-grey to white. Optionally, the tail may be retained on the shrimp during this blanching process.

Figure 2:
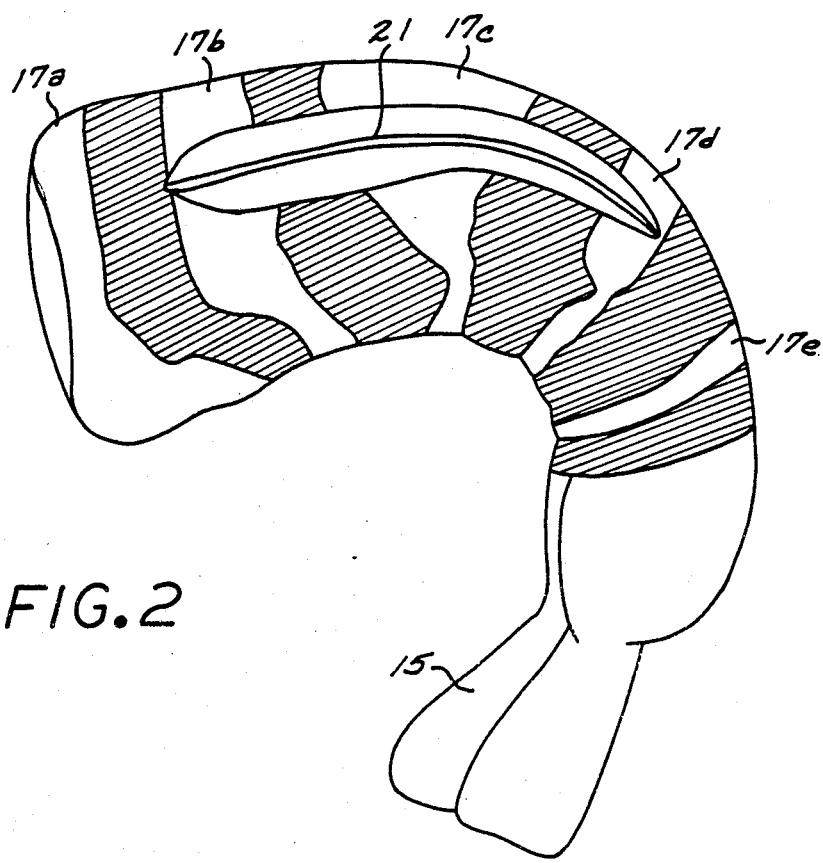
FIG. 2 is a backside perspective view of a shrimp at an intermediate stage of the process, showing the longitudinal cut in the shrimp's three intermediate body segments, to expose a substantial portion of the vein, for subsequent removal.

In the deveining and blanching process of the invention, the harvested shrimp, while still alive, is initially washed in cold water (about 15 degrees centigrade)

containing about five parts per million of chlorine. This removes a substantial portion of any bacteria present in the shrimp. Using a knife, the head 11, shell 13 and swimmerettes 19 are then removed from the shrimp, in a conventional fashion. What remains are the shrimp's five body segments 17a–17e and, optionally, the tail 15. The shrimp's intestines or vein 21 (FIG. 2) remains within the body segments, extending longitudinally from the site of the removed head to the tail. Prior processes for removing this vein have proven either to be ineffective in removing the entire vein or to cause other deficiencies such as the inhibiting of the desired change in color in the entire shrimp when subsequently cooked.

In accordance with the invention, the shrimp is deveined by making a longitudinal cut in several of the body segments 17b, 17c and 17d, to expose an intermediate portion of the vein 21. Remaining uncut are the body segment 17a, located nearest the site of the removed head 11, and the body segment 17e, located adjacent the tail 15. Optionally, body segment 17d could remain uncut, as well. The uncut body segments ensure that the shrimp's overall shape remains substantially unchanged and prevents the sides of the body segment from curling away from the cut.

The exposed vein 21 is removed from the shrimp by using a small knife to separate it from the intermediate body segments and then pulling the ends of the vein from the uncut body segments 17a and 17e. The lengths of the vein portions located within the uncut body segments are short enough that the resistance to axial pulling of the vein is minimal. Accordingly, instances of the vein breaking within the uncut body segments is small. Even then, only a very short segment of the vein will remain behind.

Immediately following the peeling process, in which the head 11, shell 13, swimmerettes 19 and vein 21 are removed from the shrimp, the shrimp is placed in ice water containing about 15 parts per million of a substance called Chololine, which is believed to be an aqueous solution of chlorine. The water is preferably maintained at a temperature lower than about 10 degrees centigrade, and this soak ensures that any remaining bacteria (e.g., salmonella) are removed from the shrimp.

After the cold water soak, the shrimp is blanched by immersing it in hot water for a prescribed time duration. This causes the entire shrimp to undergo the desired color change and thus eliminates the possibility that portions of the shrimp will remain in their unappetizing blue-grey color when subsequently cooked. More particularly, the shrimp is blanched by placing it with other, like-sized shrimp loosely in a wire basket and then immersing the basket in the hot water. The water temperature must be at least about 60 degrees centigrade and the immersion time must be at least 2 seconds, in order to achieve a complete blanching of the shrimp. Preferably, the water temperature is in the range of 85 to 95 degrees centigrade and the immersion period is about 8 seconds. The required temperature and time period will vary according to the relative sizes of the batch of shrimp being blanched and the tub of hot water into which it is immersed. Care should be taken to ensure that the water temperature is not drawn down excessively by the immersion of the relatively cold shrimp.

Care also should be taken to avoid keeping the shrimp immersed in the hot water for an excessive time period. An excessively long immersion time can bring about an undesired cooking of the shrimp, which can reduce the shrimp's weight.

Immediately following the immersion of the shrimp in the hot water, for blanching, the basket of blanched shrimp is cooled by immersion in ice water for at least about 2 minutes. The water temperature is preferably maintained at about 2 degrees centigrade. This cooling step is effective in stopping the blanching process and preventing undesired cooking of the shrimp.

The partial cut into the backside of only the intermediate body segments 17b, 17c and 17d of the shrimp ensures that when the shrimp is immersed in the hot water, as described above, substantially its entire exterior surface will change color. Previous deveining processes, in which a longitudinal cut was made through all of the shrimp's body segments, caused the shrimp's sides to curl away from the cut and prevent a full color change of the shrimp's sides. This problem is overcome by the process of the invention, which effectively prevents the shrimp from deforming in this manner.

The deveined and blanched shrimp is now in proper condition for freezing and subsequent packaging. As is conventional, the shrimp are either block frozen or individually quick frozen, at a temperature about minus 30 degrees centigrade, for about 11 minutes. Upon completion of this procedure, the core temperature of the shrimp should reach about minus 18 degrees centigrade.

It should be appreciated from the foregoing description that the present invention provides an improved shrimp peeling, deveining and blanching process that is effective in removing the entire vein from the shrimp and that ensures that the entire exterior surface of the shrimp undergoes the desired color change. The vein is removed by making a longitudinal cut into the backside of only a few intermediate body segments and by the pulling on the exposed portion of the vein, to remove that portion as well as the portions located in the uncut body segments. A subsequent blanching of the shrimp and the retention of uncut body segments at opposite ends of the shrimp ensure that the shrimp will retain its general shape and eliminate the possibility that portions of the shrimp will remain at their unappetizing blue-grey color when later cooked.

Although the invention has been described in detail with reference to the presently preferred process, those of ordinary skill in the art will appreciate that various modifications can be made without departing from the invention. Accordingly, the invention is defined only by the following claims.

I claim:

1. A process for preparing shrimp of the kind having a head, a tail, and a plurality of body segments, with an encircling shell and a plurality of swimmerettes projecting from a front side of the body segments, and with a vein extending lengthwise through the body segments, from the head to the tail, beneath a backside of the body segments, the process comprising steps of:

removing the shell, head and swimmerettes from the shrimp;

cutting longitudinally through the backside of a plurality of intermediate body segments, at least single body segments at opposite ends of the shrimp, adjacent the site of the removed head and the tail, remaining uncut, the step of cutting exposing an intermediate portion of the vein;

removing the entire vein by pulling on the exposed intermediate portion of the vein, to extract the exposed portion of the vein and to axially extract the unexposed portions of the vein located within the uncut body segments adjacent the site of the removed head and the tail; and blanching the deveined shrimp;

wherein the cut provided in the step of cutting prevents the shrimp from deforming into a shape that inhibits the blanching of certain portions of the shrimp during the step of blanching.

2. A process as defined in claim 1, wherein the cut made in the step of cutting is made just deep enough to expose the intermediate portion of the vein.

3. A process as defined in claim 1, wherein:

the shrimp includes five body segments; and the step of cutting includes a step of cutting the backside of only the three intermediate body segments.

4. A process as defined in claim 1, wherein the step of blanching includes a step of immersing the shrimp in water having a temperature that exceeds about 60 degrees centigrade, for a time period of at least about two seconds.

5. A process as defined in claim 4, wherein the step of blanching includes a step of immersing the shrimp in water having a temperature in the range of about 85 degrees centigrade to about 95 degrees centigrade, for a time period of about eight seconds.

6. A process as defined in claim 4, wherein the step of blanching includes steps of placing the shrimp with other shrimp loosely in a wire basket and immersing the basket in the water.

7. A process as defined in claim 1, and further including a step of washing the shrimp in water having a temperature of less than about 10 degrees centigrade, following the steps of cutting and removing.

8. A process as defined in claim 1, and further including a step of freezing the shrimp following the step of blanching.

9. A process as defined in claim 8, and further including a step of fully cooking the shrimp on a grill, wherein the prior step of blanching ensures that the cooked shrimp will be substantially devoid of any grey or blue portions on its exposed surface.

10. A process as defined in claim 1, wherein the tail remains attached to the plurality of body segments.

11. A process for preparing shrimp of the kind having a head, a tail, and a plurality of body segments, with an encircling shell and a plurality of swimmerettes projecting from a front side of the body segments, and with a vein extending lengthwise through the body segments, from the head to the tail, beneath a backside of the body segments, the process comprising steps of:

removing the shell, head and swimmerettes from the shrimp;

cutting longitudinally through the backside of plurality of intermediate body segments except for single body segments at opposite ends of the shrimp, adjacent the site of the removed head and tail, the step of cutting being made just deep enough to expose an intermediate portion of the vein;

removing the entire vein by pulling on the exposed intermediate portion of the vein, to extract the exposed portion of the vein and to axially extract the unexposed portions of the vein located within the uncut body segments adjacent the site of the removed head and tail;

washing the deveined shrimp in water having a temperature of less than about 10 degrees centigrade;

blanching the deveined shrimp by placing it with other shrimp loosely in a wire basket and immersing in water having a temperature in the range of about 85 degrees centigrade to about 95 degrees centigrade, for a time period of about eight seconds; and freezing the blanched shrimp;

wherein the cut provided in the step of cutting prevents the shrimp from deforming into a shape that inhibits the blanching of certain portions of the shrimp during the step of blanching.

* * * * *